United States Patent
Minborg et al.

(10) Patent No.: US 12,461,912 B2
(45) Date of Patent: Nov. 4, 2025

(54) METHOD AND APPARATUS FOR MAPPING JAVA STREAMS TO JPA COMMANDS

(71) Applicant: Speedment AB, Stora Höga (SE)

(72) Inventors: Per Ake Minborg, Stora Höga (SE); Mislav Milicevic, Mostar (BA)

(73) Assignee: Speedment AB, Stora Höga (SE)

( * ) Notice: Subject to any disclaimer, the term of this patent is extended or adjusted under 35 U.S.C. 154(b) by 0 days.

(21) Appl. No.: 18/042,235

(22) PCT Filed: Aug. 20, 2021

(86) PCT No.: PCT/EP2021/073191
§ 371 (c)(1),
(2) Date: Feb. 20, 2023

(87) PCT Pub. No.: WO2022/038284
PCT Pub. Date: Feb. 24, 2022

(65) Prior Publication Data
US 2024/0020302 A1 Jan. 18, 2024

Related U.S. Application Data

(60) Provisional application No. 63/067,924, filed on Aug. 20, 2020.

(51) Int. Cl.
*G06F 7/00* (2006.01)
*G06F 8/51* (2018.01)
*G06F 16/242* (2019.01)

(52) U.S. Cl.
CPC .......... *G06F 16/2448* (2019.01); *G06F 8/51* (2013.01)

(58) Field of Classification Search
CPC .... G06F 16/2448; G06F 8/51; G06F 16/2433; G06F 16/24534; G06F 16/2452; G06F 16/3332; G06F 16/3337; G06F 16/8358
See application file for complete search history.

(56) References Cited

U.S. PATENT DOCUMENTS

| | | | |
|---|---|---|---|
| 7,962,902 B2* | 6/2011 | Chow | G06F 16/972 707/769 |
| 9,378,034 B2* | 6/2016 | Matov | G06F 9/45525 |

(Continued)

OTHER PUBLICATIONS

Khaled Alshurafa; Type-safe Functional Queries over Object-oriented Data Models; Hamburg University of Science and Technology Software Systems Institute (STS) Jul. 30, 2009 (Year: 2009).*

(Continued)

*Primary Examiner* — Mohammed R Uddin
(74) *Attorney, Agent, or Firm* — Renner, Otto, Boisselle & Sklar, LLP (57) ABSTRACT

The invention relates to a computer implemented method for efficient access to a database via a functional model-based procedure by translating a sequence of operations that are stored in a memory and that is described in the procedure that is specified using a generalized programming language into an intermediate database abstraction layer access language, whereby the intermediate data abstraction layer not being SQL. The method comprises: generating by a processor: an initial builder corresponding to an original originating source, zero or more intermediate operations and a terminating operation; storing in the memory, the sequence of operations, and translating the builder or parts of the builder is translated to at least one operation using the intermediate database abstraction layer access language upon specifying the terminating operation.

10 Claims, 3 Drawing Sheets

(56) References Cited

U.S. PATENT DOCUMENTS

| | | | |
|---|---|---|---|
| 11,907,312 B1* | 2/2024 | Li | G06N 7/00 |
| 2004/0015834 A1* | 1/2004 | Mestre | G06F 8/10 |
| | | | 717/114 |
| 2006/0048097 A1* | 3/2006 | Doshi | G06F 8/315 |
| | | | 717/106 |
| 2010/0122239 A1* | 5/2010 | Neufeld | G06F 11/348 |
| | | | 707/E17.014 |
| 2010/0211939 A1* | 8/2010 | Ali | G06F 8/42 |
| | | | 707/E17.014 |
| 2010/0241637 A1* | 9/2010 | Kissner | G06F 16/24565 |
| | | | 707/752 |
| 2010/0293209 A1* | 11/2010 | Bireley | G06F 16/2445 |
| | | | 707/718 |
| 2010/0332473 A1* | 12/2010 | Brodsky | G06F 11/3636 |
| | | | 707/736 |
| 2012/0124080 A1* | 5/2012 | Willard | G06F 16/2438 |
| | | | 707/769 |
| 2013/0054630 A1* | 2/2013 | Briggs | G06F 16/2452 |
| | | | 707/E17.127 |
| 2015/0278314 A1* | 10/2015 | Fuglsang | G06F 16/2452 |
| | | | 707/736 |
| 2017/0161307 A1* | 6/2017 | Minborg | G06F 16/23 |
| 2018/0052708 A1* | 2/2018 | Ganesan | G06F 9/4812 |
| 2021/0034615 A1* | 2/2021 | Chen | G06F 16/2452 |
| 2021/0248143 A1* | 8/2021 | Khillar | G06F 16/2379 |
| 2024/0020302 A1* | 1/2024 | Minborg | G06F 16/2448 |

OTHER PUBLICATIONS

International Search Report mailed Nov. 29, 2021, for priority International Patent Application No. PCT/EP2021/073191.
International Preliminary Report on Patentability mailed Dec. 6, 2022, for priority International Patent Application No. PCT/EP2021/073191.

* cited by examiner

METHOD AND APPARATUS FOR MAPPING JAVA STREAMS TO JPA COMMANDS

This application is a national phase of International Patent Application No. PCT/EP2021/073191 filed Aug. 20, 2021, which claims priority to U.S. Provisional Patent Application No. 63/067,924 filed Aug. 20, 2020, each of which is hereby incorporated herein by reference in its entirety.

TECHNICAL FIELD

The present invention generally relates to methods and apparatus for the exchange of messages in a communication network. More specifically, various embodiments relate to a communication system, which connects to a private or public data communication network (such as the Internet) and allows applications to retrieve, update and/or delete digital objects (such as database objects) in a manner adapted to modern programming languages. In particular, Java Streams may be mapped to Java Persistence API commands where a subset of the stream operations are executed on the database side rather than in the stream itself.

BACKGROUND

Many organizations have mission-critical data in databases such as SQL databases or NoSQL databases. Data in these databases are often accessed using specialized query languages such as SQL. However, the SQL standard is relatively old and does not support an object-oriented and/or functional programming approach.

Application developers are facing a number of problems when they handle digital objects in data sources. They often need to write code that converts from the underlying data source paradigm to modern program languages objects/functional and programming paradigms. They also need to express logic in different languages (e.g., Java and SQL) or using imperative methods with high code complexity metrics.

Recently, functional programming models have been added to object-oriented languages (such as the Java programming language). These functional additions make it possible for application developers to express what they want to do and not so much how it is done. However, the programming model for many databases (for example SQL databases) is fundamentally different from any functional view and so there is no obvious mapping from the functional view to the programming models used by many databases.

Applicants have identified that there are several problems in the present way of handling objects and functions in a communication network, searching for, inserting, changing or deleting specific digital objects and subsequently obtaining them because of several reasons described above and hereunder. In view of the foregoing, it may be understood that there are significant problems and shortcomings associated with existing approaches for obtaining and storing digital objects.

SUMMARY

One technical effect of the systems and methods described herein is that they facilitate more efficient database access and can improve the performance and user experience of Internet or web applications. Another technical effect of the systems and methods described herein lies in improved database management including automated generation of database code.

Some embodiments have been successfully deployed on a variety of platforms ranging from large server clusters down to small embedded servers with very limited memory and CPU performance (e.g. Raspberry Pi).

Various embodiments of the present invention relate to a communication system, which connects to a private or public data communication network allowing applications to retrieve, update and/or delete digital (database) objects in a manner adapted to modern programming languages. In particular, Java Streams are mapped to Java Persistence API (hereafter denoted JPA) commands where a subset of the stream operations are executed on the database side rather than in the stream itself.

Several novel solutions are devised by the applicants to overcome various problems. The present invention discloses methods and apparatuses for mapping Java streams to JPA commands whereby application developers can remain in an object-oriented and/or functional programming model while still accessing the content in databases such as SQL databases or NoSQL databases, via a standardized database access framework, such as JPA. This allows almost any database type to be accessed since the standardized database access frameworks will adapt to the specific dialect used by a particular database type.

The various embodiments are in no way limited to the Internet or its current state. All the methods and apparatus may be applied in other data communication networks facilitating communication between two or more distinct locations as well as internal communication within a single node. In some embodiments, Java streams are mapped to JPA commands so that application developers can continue to use their object/functional oriented paradigm while communicating with a SQL database. This contrasts to solutions where Java streams are mapped to SQL and where the rendered SQL varies with the SQL dialect and where the obtained entities do not otherwise conform to the JPA standard.

Accordingly, in one aspect a method is provided for translating a sequence of operations described using a generalized programming language (such as Java) into one or more database access commands in a database access language via an intermediate framework (such as JPA). The method includes generating an initial builder that corresponds to a Stream pipeline. The initial builder includes an initial database table (or database view) source. The builder consists of a Source, a set of intermediate operations and a terminal operation.

In a variant of the present invention, the initial builder is optimized before being rendered to JPA commands. In this process, intermediate operations may be re-ordered, removed, added and/or replaced to form an equivalent but more optimal form. These optimization steps will be explained in detail below.

In a variant of the present invention, only a subset of the builder's operations are rendered to JPA commands whereby the remaining parts (if any) of the stream logic are handled by the JVM itself. For example, this is true for anonymous lambdas or where the builder cannot extract meta-data from operation parameters.

In yet another variant of the present invention, the rendering of JPA commands are split into sub-queries, allowing a larger portion of the stream logic to be executed on the database side. This includes, for example, the case where projections or aggregates are forming intermediate values in the stream pipeline.

In addition, the method includes updating the initial builder if the builder is not fully translatable. The updating includes modifying the initial database access command according to a first set of intermediate operations, into a modified database access command. If the first set of operations is determined not to be translatable, the method includes partitioning the sequence of operations into a first subsequence that includes the original first set of operations, and a second subsequence that includes remaining operations designated as a new sub-operation, and upstream operations, if any. This process can be repeated ad infinitum so that a plurality of partitions may be created.

According to another aspect of the invention a computer implemented method for efficient access to a database via a functional model-based procedure by translating a sequence of operations that are stored in a memory and that is described in the procedure that is specified using a generalized programming language into an intermediate database abstraction layer access language, the intermediate data abstraction layer not being SQL. The method comprises: generating by a processor: an initial builder corresponding to an original originating source, zero or more intermediate operations and a terminating operation; storing in the memory, the sequence of operations; and translating the builder or parts of the builder is translated to at least one operation using the intermediate database abstraction layer access language upon specifying the terminating operation.

According to one embodiment, the intermediate database abstraction layer access language is Java Persistence API (JPA). In one exemplary embodiment, the initial builder is optimized before being rendered to the intermediate database abstraction layer access language. The intermediate operations and terminal operations may be re-ordered, removed, added and/or replaced to form an equivalent but form. In one embodiment, the intermediate operations of same type are individually reordered while preserving Stream equivalence; or adjacent operations of same type that preserve {Order, Type, State, Side Effect} are squashed into one single equivalent operation; or intermediate operations that are of different types are reordered while still preserving Stream equivalence.

In one exemplary embodiment, a terminal operation may be replaced by another terminal operation, a terminal operation may be updated or wherein a terminal operator may be replaced or updated in conjunction with modifying the list of intermediate operations to form an equivalent builder. In yet another embodiment, if an intermediate operation is not translatable, the method may further comprise: moving the un-translatable operation further down the order in the builder and translating the translatable operation using the intermediate database abstraction layer language and subsequently applying the un-translatable operation on a resulting database object obtained from the translatable operation. In one embodiment, the method may further comprise subsequently rendering an intermediate operation is a "flat-Map" operation to the intermediate database abstraction layer access language that reduces using one or more sub-queries. In one embodiment, the method may further comprise translating certain summarizing terminating operations to the intermediate database abstraction layer access language reducing the amount of data being transferred from the database. The terminating operations is one or several of sum, min, max, average and summaryStatistics. In yet another embodiment an intermediate operation comprises a projection that is subsequently translated to the intermediate database abstraction layer access language reducing the amount of data that is transferred from the database. In one embodiment, the generalized programming language is Java. In one embodiment, the builder takes the shape of a java.util.Stream object.

The invention also relates to a computer implemented method for efficient access to a database via a functional model-based procedure by translating a sequence of operations that are stored in a memory and that is described in the procedure that is specified using a generalized programming language into an intermediate database abstraction layer access language. The intermediate data abstraction layer not being SQL. The method comprises the steps of: creating a first builder; providing a source representing a type of the stream, whereby a stream is returned for subsequent use; optionally adding an intermediate operation to the stream, if intermediate operations are to be used; determining to or not to add additional intermediate operations: if at least one additional intermediate operation is to be added to the stream, continuing to optionally add an intermediate operation to the stream; adding a single terminal operation to the stream; optionally reordering the stream pipeline and/or replacing the operations and/or modified and/or complementing with additional operations or otherwise changing to form an equivalent and optimized stream; rendring a set of the stream's pipeline to Java Persistence API (JPA) operations, which are handled by an underlying JPA provider framework and where the underlying JPA provider framework returns an object of a form that can be converted to a second stream that is functionally equivalent to the first Stream which was built in first to fourth steps; and returning the second equivalent stream to a user code.

The invention also relates to a system comprising at least one processing unit and at least one memory configured for efficient access to a database via a functional model-based procedure by translating a sequence of operations that are stored in at least one memory and described in the procedure that is specified using a generalized programming language into an intermediate database abstraction layer access language, the intermediate data abstraction layer not being SQL. The at least one processing unit is configured to: generate an initial builder corresponding to an original originating source, zero or more intermediate operations and a terminating operation; store in the memory the sequence of operations; and translate the builder or parts of the builder is translated to at least one operation using the intermediate database abstraction layer access language upon specifying the terminating operation.

BRIEF DESCRIPTION OF THE DRAWINGS

Reference is made to the attached drawings, wherein elements having the same reference number designation may represent like elements throughout.

DETAILED DESCRIPTION

Various embodiments will now be described in more detail, sometimes with reference to the accompanying drawings. It should be understood that different aspects of the present invention are not limited to these embodiments. Those of ordinary skill in the art having access to the teachings herein will recognize additional implementations, modifications, and embodiments, as well as other fields of use, which are within the scope of the present invention as described herein, and with respect to which the present invention may be of significant utility.

In one variant of the present invention, a Java Stream:

```
jpaStreamer.stream(Film.class)
    .filter(Film$.rating.equal("G"))
    .sorted(Film$.length.reversed( ))
    .sorted(Film$.title.comparator( ))
    .filter(Film$.length.greaterThan(100))
    .skip(10)
    .limit(5)
    .findFirst( )
```

Could be optimized to the following equivalent stream by means of a process called "HETEROGENEOUS COMMUTATIVE REORDERING", further described below, whereby certain intermediate operators of different types are reorder while retaining Stream equivalence:

```
jpaStreamer.stream(Film.class)
    .filter(Film$.rating.equal("G"))
    .filter(Film$.length.greaterThan(100))
    .sorted(Film$.length.reversed( ))
    .sorted(Film$.title.comparator( ))
    .skip(10)
    .limit(5)
    .findFirst( )
```

Further being optimized to the following stream by means of a process called "HOMOGENOUS SQUASHING", further described below, whereby certain intermediate operators of the same type are merged to a single operator while retaining Stream equivalence:

```
jpaStreamer.stream(Film.class)
    .filter(Film$.rating.equal("G").and(Film$.length.greaterThan(100)))
    .sorted(Film$.length.reversed( ).thenComparing(Film$.title.comparator( )))
    .skip(10)
    .limit(1)
    .findFirst( )
```

The optimized stream will subsequently be rendered to the following JPA commands:

```
CriteriaBuilder cb = ...;
CriteriaQuery<Film> cq = ...;
Root<Film> root = ...;
TypedQuery<Film> tq = ...;
cb.and(cb.equal(root.get("rating"), "G"), cb.gt(root.get("length"), 100)))
cq.orderBy(cb.desc(root.get("length")), cb.asc(root.get("title")))
tq.setFirstResult(10);
tq.setMaxResults(1);
```

Which, in turn, will be rendered to the following SQL statement:

```
SELECT
    film0_.film_id as film_id1_0_,
    film0_.description as descript2_0_,
    film0_.last_update as last_upd3_0_,
    film0_.length as length4_0_,
    film0_.rating as rating5_0_,
    film0_.rental_duration as rental_d6_0_,
    film0_.rental_rate as rental_r7_0
```

```
    film0_.replacement_cost as replacem8_0_,
    film0_.special_features as special_9_0_,
    film0_.title as title10_0
FROM film film0_
WHERE film0_.rating=? AND film0_.length>100
ORDER BY film0_.length DESC, film0_.title ASC
LIMIT ?,
OFFSET ?
```

Once the terminal operation is invoked, an introspection of the pipeline is performed, applying a sequence of optimizations to its contents. In this process, intermediate operations may be re-ordered, removed, added and/or replaced to form an equivalent but more optimal form.

The introspection process can be analyzed in individual steps, like so:

1. Intermediate Operation Squashing

If multiple intermediate operations of the same type are sequentially invoked, they may be transformed into a singular operation, under the condition that the optimized operation is semantically the same as the non-optimized sequence of operations and that the following Stream properties would be preserved after invocation of said sequence of operations: Order, Type, State, Side Effect.

In the previously provided Java Stream, the intermediate operation sorted( ) is invoked in the manner described above:

```
.sorted(Film$.length.reversed( ))
.sorted(Film$.title.comparator( ))
```

Invocation of said operations adheres to the conditions described above, enabling to transform them into a single operation:

.sorted(FilmVength.reversed( ).thenComparing(Film$.title.comparator( ))

2. Delegation of Execution

An intermediate operation may be executed by the database if:
  the intermediate operation has a functionally equivalent operation defined in the SQL standard An intermediate operation may be translated to a JPA command if:
  the intermediate operation has a functionally equivalent command defined in the JPA API
  necessary meta-data can be extracted from intermediate operation parameters, in the case that the intermediate operation expects one or more parameters in order to execute correctly If the conditions defined above are met, the execution of an intermediate operation may be delegated to a SQL database by translating them to their JPA equivalents.

Figure 1:
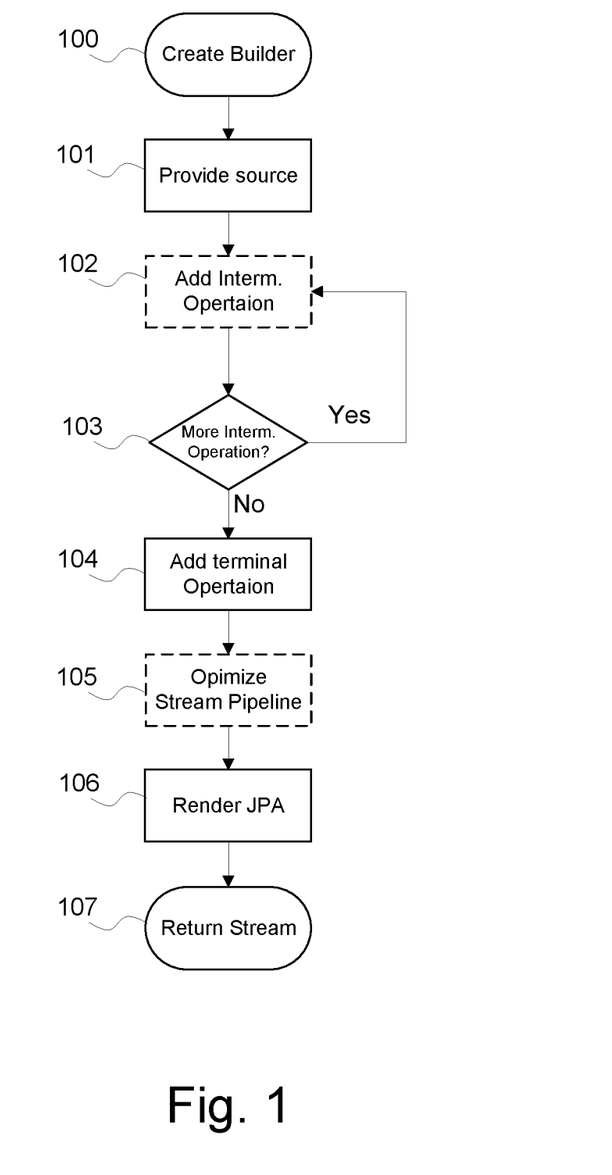
FIG. 1 is a diagram of an exemplary method steps of the invention.

FIG. 1 shows a variant of the steps of exemplary method of the present invention whereby, in step 100, a first builder is created. In step 101, the user provides some kind of source which could also represent the type of the stream (for example an entity class representing a database table or view) whereby a Stream is returned for subsequent use. In step 102 (which is optional and can be skipped if no intermediate operations are to be used) an intermediate operation is added to the Stream. In step 103, the user may decide whether or not to add additional intermediate operations. If at least one additional intermediate operation is to be added to the Stream, the process continues at 102. If no additional intermediate operation is to be added to the Stream, the process continues at 104. In Step 104, a single terminal operation is added to the Stream. At step 105, which is optional, the stream pipeline (including the source, intermediate and/or terminal operations) is reordered and/or operations are replaced and/or modified and/or are complemented with additional operations or are otherwise changed to form an equivalent but more optimized Stream. In step 106, a set of the Stream's pipeline (e.g. the source, intermediate operations and terminal operation) are rendered to JPA operations, which are handled by an underlying JPA provider framework and where the underlying JPA provider framework returns an object of a form that can be converted (potentially using an identity function) to a second Stream that is functionally equivalent to the first Stream which was built in steps 101-104. In step 107, the second equivalent Stream is returned to the user code.

In order to simplify the description below, the disclosure herein refers to datastores in general and uses Structured Query Language (SQL) databases as examples. A datastore is typically an application that enables storage and retrieval of digital objects including but not limited to SQL databases, Wide Column Store, Column Families, Document Store, Key/Value Store, Tuple Store, Graph Databases, Multi-Model Databases, Object Databases, Grid and Cloud Databases, XML Databases, Multidimensional Databases, Multi-value Databases, NoSQL databases, XML files, and/or Spread Sheet and files. An SQL database can be any database partially or fully complying with any of the Structured Query Language (SQL) standards. Commonly used SQL-databases such as Apache Derby™, Amazon Aurora™, IBM DB2™, Hadoop™, SAP Sybase IQ™, Oracle™, MySql™, MariaDB™, etc. are within the scope of various embodiments. It should be understood that the databases stated herein are only a few examples and that various other databases are within the scope of various embodiments. It should also be noted that various embodiments are not restricted to just SQL databases. Additionally or in the alternative, some embodiments may connect to or be implemented for a number of different data sources and applications accessing such data sources. Those skilled in the art of programming and databases will generally understand how code for one database type may be written for another database type.

Additionally or alternatively, some embodiments can also be used for NoSQL database types, including, but not limited to; MongoDB, Cassandra, Riak, Oracle NoSQL Database, Neo4J, Hazelcast, MonetDB, Hadoop, Hadoop/HBase.

The terms "set" and "subset" are used throughout the description. A set is a collection of objects. A set can be empty. A set A is said to be empty if it does not contain any objects. In the following, a set B is a subset of a set C if B is "contained" inside C. B and C may coincide.

In the following several examples will be depicted. The examples are shown in the programming language Java but various embodiments are in no way limited to this particular programming language. In fact, many other programming languages including, but not limited to; Ada, BASIC, C, C++, C #, Clojure, D, Erlang, Haskel, Java Script, Kotlin, PHP, Visual BASIC, and/or any other programming language, may be used to implement different embodiments. Those skilled in the art of programming will generally understand how code in one programming language may be written in another programming language.

In the following, several methods will be disclosed that translates from an object-oriented/functional view and/or pipeline, optionally via an intermediary framework, to SQL. There are numerous combinations of examples that could be shown. Here, only a small subset of those possible examples will be shown. This should not limit the scope of various embodiments, however. Those skilled in the art should generally understand that other examples can be used, as well.

A serial computer program can be seen as a list of operations on a set of source data that will produce a single result. At the beginning of this pipeline of operations there is a source and at the end there is a terminal operation. Between these are a series of intermediate operations. These can for an example be filters that excludes some elements from the pipeline, mappers that transforms the data from one type to another, flattening mappings that replaces each element with a series of inner elements, sorters that changes the order of the elements or reductions that merges multiple elements into one single element of data. There can also be flow control operations, for example limits that only allow a certain amount of elements to pass through or skip instructions that throw away a certain amount of elements before letting the rest through.

One way of expressing such operations is a Java Stream as described in the following:
  https://docs.oracle.com/javase/8/docs/api/java/util/stream/package-summa.html, which shows the initial release of classes to support functional-style operations on streams of elements, such as map-reduce transformations on collections including java.util.stream.Stream, and
  https://docs.oracle.com/en/java/javase/14/docs/api/java.base/java/util/stream/package-summary.html, which shows a more evolved version of the stream classes with added functionality,
(The entire contents of the links and its sub-links to be incorporated herein by reference.)

In short, by means of processing unit, Streams are derived from a source, containing zero or more intermediate operators (such as map, filter and skip) and finally a terminal operation (such as count, collect or reduce). Streams can also hold additional properties such as close handlers, parallel flag and ordered flag. Thus, they can describe a computational pipeline of operations.

Data is oftentimes stored in databases of various kinds. There are many variants of basic database functionality and type as mentioned earlier in this document. In order to simplify application development and to allow the underlying database to be replaced while largely retaining the same application code, an intermediate framework is often used to abstract away the specifics of the database implementation. One such standard is JPA which is described in the following link https://javadoc.io/doc/javax.persistence/javax.persistence-api/latest/index.html (which shows the Java Persistence API which sits atop SQL and JDBC and abstracts away these lower-level models thereby allowing data objects to be used directly in user code and the entire contents of the link and is sub-links to be incorporated herein by reference). The present invention is not limited to any specific variant (past or present) of the JPA standard. The present invention is not limited to any specific type of intermediate framework standard or implementation thereof. In short, JPA is a standard that allows Java entities (e.g., classes that correspond to database tables or views) to be managed in such a way that they abstract away the data layer of the database. Application developers can just update a Java entity and when a transaction completes, the updates are persisted back to the database. Application developers can also query underlying databases and obtain matching Java entities There are a plurality of JPA providers that provide their own implementation of the JPA standard some including but not limited to Hibernate, EclipseLink, Apache OpenJPA, Batoo JPA, DataNucleus (formerly JPDX), EclipseLink (formerly Oracle TopLink), IBM, for WebSphere Application Server, Kundera, ObjectDB, OpenJPA, OrientDB, Versant Corporation JPA (not relational, object database)

The present invention is not limited to any specific provider of the JPA standard.

Stream to JPA Rendering

In the following, some exemplary variants of the present invention will be disclosed that are able to render JPA commands directly from Java Streams.

Source

A Source may contain all elements from a data collection including but not limited to a database table, a database view or a collection of columns. A stream from a source does not need to have any particular order. Thus, the order in which elements appear in the stream may change from one invocation to another.

In one variant of the present invention, the source is indicated by providing a JPA @Entity bean that also provides the generic type of the Stream.

Intermediate Operations

Intermediate operations can be characterized in terms of their preservation of certain properties. Table 1 shows a list of intermediate operations and a set of properties whereby, for each intermediate operation, it is indicated whether or not a particular property is preserved.

TABLE 1

| Operation | Order | Type | Size | StreamType | State |
|---|---|---|---|---|---|
| filter | 1 | 1 | | 1 | 1 |
| map | 1 | | 1 | 1 | 1 |
| mapToInt | 1 | | 1 | | 1 |
| mapToLong | 1 | | 1 | | 1 |
| mapToDouble | 1 | | 1 | | 1 |
| flatMap | | | | 1 | 1 |
| flatMapToInt | | | | | 1 |
| flatMapToLong | | | | | 1 |
| flatMapToDouble | | | | | 1 |
| distinct | 1 | 1 | | 1 | 1 |
| sorted | | 1 | 1 | 1 | 1 |
| sorted(c) | | 1 | 1 | 1 | 1 |
| peek | 1 | 1 | 1 | 1 | 1 |
| limit | 1 | 1 | | 1 | 1 |
| skip | 1 | 1 | | 1 | 1 |
| takeWhile | 1 | 1 | | 1 | |
| dropWhile | 1 | 1 | | 1 | |

Thus, the intermediate operation "filter" preserves the order of elements in the stream as well as the type of elements in the stream. It also preserves the actual stream type (e.g. it returns a Stream and not an IntStream, LongStream or a DoubleStream) but may change the size of the stream. The intermediate operation "map" also preserves the order of elements in the stream, but the type is potentially changed. It preserves the stream type and, as opposed to filtering, it preserves the size. A third example is "order" which obviously does not preserve the order of elements but where the size and stream types are preserved.

The meaning of the properties is summarized in the Table 2:

TABLE 2

| Property | Meaning |
|---|---|
| Order | The order between elements in the Stream (if any). |
| Type | The type of the elements in the Stream |
| Size | The number of elements that appears in the Stream. |
| StreamType | The type of the stream |
| State | The internal state of the stream (e.g. skipped elements) |
| Side Effect | If the operation has a side-effect (e.g. peek) |

These properties may be significant in how intermediate operations can be reordered without affecting the outcome of the Stream.

Homogenous Commutative Reordering

Some intermediate operations of the same type can be individually reordered while preserving Stream equivalence (i.e. they are commutative). For example, filter operations that are adjacent can be reordered. This is easily understood by observing the following example:
stream( )
 .filter(predicate1)
 .filter(predicate2)
Is equivalent to
stream( )
 .filter(predicate1)
 .filter(predicate2)
This can be proved like this:

stream( ).filter(predicate1) .filter(predicate2) =
stream.filter(predicate1.and(predicate2)) =
{Commutative Property of "and"}
stream( ).filter(predicate2.and(predicate1)) =
stream.filter(predicate2).filter(predicate1)
Another intermediate operation that can be reordered is "skip":
stream( ).skip(N1).skip(N2) =
stream( ).skip(N1+N2) = {Commutative Property of "+"}
stream( ).skip(N2+N1) =
stream( ).skip(N2).skip(N1)

A third intermediate operation that can be reordered is "limit":

stream( ).limit(N1).limit(N2) =
stream( ).limit(min(N1, N2)) = {Commutative Property of "min"}
stream( ).limit(min(N2, N1)) =
stream( ).limit(N2).limit(N1)

The "distinct" operation is also commutative in this perspective as more than one distinct operation in a row is redundant. So, stream( ).distinct( ).distinct( )=stream( ).distinct( ).

More generally, adjacent intermediate operations of the same type are commutative if and only if they preserve {Order, Type, State, Side Effect}. Thus, only the intermediate operations filter, skip, limit, and distinct are homogeneously commutative.

Homogenous Squashing

As shown in the previous clause, adjacent operations of the same type that preserve {Order, Type, State, Side Effect} can be squashed into one single equivalent operation:

```
stream( ).filter(predicate1) .filter(predicate2) =
    stream.filter(predicate1.and(predicate2))
stream( ).skip(N1).skip(N2) =
    stream( ).skip(N1+N2)
stream( ).limit(N1).limit(N2) =
    stream( ).limit(min(N1, N2))
stream( ).distinct( ).distinct( ) =
    stream( ).distinct( )
```

Heterogeneous Commutative Reordering

Interestingly, it is possible to reorder intermediate operations that are of different types while still preserving Stream equivalence.

For example, it is possible to freely move a filter operation across any number of sort operations. More generally, it is possible to move any operation that preserves {Type, State} across any other operation that preserves {Type, State} but that preserves a property that the first operation did not preserve.

Table 3 is a list of possible reorderings:

TABLE 3

| Original Operation | Operations that can be moved before/after the original operation |
|---|---|
| Filter | sorted, distinct |
| Sorted | filter, distinct |
| Distinct | filter, sorted |

Other operations cannot be reordered. In particular, skip and limit cannot be reordered across themselves.

Miscellaneous

Any intermediate operations of type peek can be removed if its potential side effect can be ignored. In a variant of the present invention, the allowing of peek operation removal is settable.

Terminal Operations

Certain optimizations may be done for a subset of the terminal operations. These are divided into three categories: Modification, Pipeline Optimization and Rendering.

Modification

Certain terminal operations can be modified to create a potentially more optimized pipeline.

The anyMatch terminal operation can be split into the following equivalence:
.anyMatch(p)=
filter(p)
.count( )>0
Or
.filter(p)
.limit(1)
.anyMatch(( )→true)
Or
.filter(p)
.limit(1)
.findAny( )
.isPresent( )

The noneMatch terminal operation can be split into the following equivalence:
.noneMatch(p)=
.filter(p)
.limit(1)
.count( )=0
Or
filter(p)
.limit(1)
.noneMatch(( )→true)
Or
not( . . .
.filter(p)
.limit(1)
.findAny( )
.isPresent( ))

The findFirst terminal operation can be split into the following equivalence:
.findFirst( )=
.limit(1)
.findFirst( )

The findAny terminal operation can be split into the following equivalence:
findAny( )=
.unordered( )
.limit(1)
.findAny( )

Pipeline Optimizations

Certain preconditions allow the stream pipeline to be further optimized:

General Optimizations

If at least one of the following conditions are true:
A) the stream is unordered (e.g. the Stream::unordered has been called)
B) the terminal operation does not require the order to be preserved (for example forEach and min)
C) The stream is parallel and terminal operation does not require the order to be preserved for parallel streams Then, the longest consecutive string of intermediate operations starting from the back that only affects the order of elements (i.e. Sorted) can be removed.

For example, the terminal operation count, starting from the end, the longest string of Intermediate operations that preserve the Size property can safely be removed.

Specific Rendering

If the parameter to a terminal operation min is a recognizable field, the operation can be directly rendered to JPA CriteriaBuilder::min If the parameter to a terminal operation min is a recognizable field, the operation can be directly rendered to JPA CriteriaBuilder::max If the parameter to a terminal operation is count the operation can be directly rendered to JPA CriteriaBuilder::count Parameters with No Metadata Parameters (such as Predicates) that do not contain any metadata (e.g. a column name) can sometimes be identified anyhow by comparing a set of parameter properties against a known entity's set of properties.

In a variant of the present invention, if parameters (such as a Predicate) do not contain any metadata or cannot otherwise be identified, they are moved down the order (according to the rules of stream equivalence) of the stream pipeline to allow as much as possible of the Stream to be rendered to JPA and be executed on the database side. In a variant of the present invention, the operations that did not contain any metadata will be executed in the JVM rather than on the database side.

Rendering Pipeline

In a variant of the present inventions, there are two different pipelines called the "Stream pipeline" and the "Rendering pipeline". The former is a mutable projection of a Java Stream and the latter is a procedure designed to materialize a Stream pipeline.

Ideally, the rendering pipeline would only have to materialize what is given to it, but since it cannot be guarantee that the Stream pipeline will be in its most optimal state once it reaches the rendering stage, the rendering procedure takes additional preliminary steps as been previously described in this document with respect to both Intermediate and Terminal operations.

With this in mind, the rendering pipeline can be described in three steps:
1. Stream pipeline optimization (as previously described)
2. Stream pipeline to JPA conversion (whereby Stream operations are mapped to JPA)
3. Stream pipeline rendering (whereby the mapped operations are applied)

The examples below are illustrated using a fictitious product name "JPAStreamer" which works according to a variant of the present invention. The invention is not limited by the concrete examples below. JPAStreamer generated support classes that can produce Predicates, Comparators and other type safe entities that contain metadata sufficient to render the parameters and their corresponding commands to JPA. For example, a table name Table will have an additional class Table$ generated with functionality to produce an infinite number of Predicates attributed with metadata. The generated class will have type-safe predicate builders generated for each column in the original class (e.g. if Film has a field "title" then Film$ will have a predicate builder that corresponds to the name and type of the Film$.title field). The generation of these conveniency predicate builders are optional and corresponding Predicates with metadata could be provided by other means (including but not limited to decorating the original fields, providing metadata manually or otherwise generating or producing equivalent code)

Stream Pipeline to JPA Conversion

Most Stream operations have a SQL equivalent which they can be mapped to while retaining the same semantics. Since JPA provides a means of constructing SQL queries in a type-safe manner (CriteriaBuilder), one can assume that the same mappings can be applied to JPA.

Filter

Java Streams allow filtering its contents based on a specific condition or a set of conditions. These conditions are expressed through Java Predicate objects. An of example of a Stream filter looks like this:

Stream.of(1, 2, 3, 4, 5).filter(x→x>2)

In SQL, these conditions are expressed through WHERE clauses. An example WHERE clause may look like this:

WHERE column >2

Regular Java Predicates lack information to construct correct WHERE clauses. As a solution, JPAStreamer generates its own set of specialized Predicates containing the necessary information needed to construct a WHERE clause. This is exemplified below using the generated class Table$.

Due to technical limitations, JPA provides their own Predicate implementation. Even though they carry the same name and function, internally they are different. These differences may require creating appropriate conversions between the two APIs as disclosed in Table 4:

TABLE 4

| JPAStreamer Predicate | JPA Predicate |
| --- | --- |
| Table$.column.alwaysTrue( ) | cb.isTrue(cb.literal(true)) |
| Table$.column.alwaysFalse( ) | cb.isFalse(cb.literal(true) |
| Table$.column.isNull( ) | cb.isNull(root.get(column)) |
| Table$.column.isNotNull( ) | cb.isNotNull(root.get(column)) |
| Table$.column.equal(value) | cb.equal(root.get(column), value) |
| Table$.column.notEqual(value) | cb.notEqual(root.get(column), value) |
| Table$.column.lessThan(value) | cb.lt(root.get(column), value) |
| Table$.column.lessOrEqual(value) | cb.le(root.get(column), value) |
| Table$.column.greaterThan(value) | cb.gt(root.get(column), value) |
| Table$.column.greaterOrEqual(value) | cb.ge(root.get(column), value) |
| Table$.column.between(value1, value2) | cb.between(root.get(column), value1, value2) |
| Table$.column.notBetween(value1, value2) | cb.or(cb.le(column, value1), cb.ge(column, value2)) |
| Table$.column.in(values) | root.get(column).in(values) |
| Table$.column.notIn(values) | root.get(column).in(values).not( ) |
| Table$.column.equalIgnoreCase(value) | cb.equal(cb.lower(root.get(column)), value.toLowerCase( )) |
| Table$.column.notEqualIgnoreCase(value) | cb.notEqual(cb.lower(root.get(column)), value.toLowerCase( )) |
| Table$.column.startsWith(value) | cb.like(root.get(column), value + "%") |
| Table$.column.notStartsWith(value) | cb.notLike(root.get(column), value + "%") |
| Table$.column.startsWithIgnoreCase(value) | cb.like(cb.lower(root.get(column)), value.toLowerCase( ) + "%") |
| Table$.column.notStartsWithIgnoreCase(value) | cb.notLike(cb.lower(root.get(column)), value.toLowerCase( ) + "%") |
| Table$.column.endsWith(value) | cb.like(root.get(column), "%" + value) |
| Table$.column.notEndsWith(value) | cb.notLike(root.get(column), "%" + value) |
| Table$.column.endsWithIgnoreCase(value) | cb.like(cb.lower(root.get(column)), "%" + value.toLowerCase( )) |
| Table$.column.notEndsWithIgnoreCase(value) | cb.notLike(cb.lower(root.get(column)), "%" + value.toLowerCase( ) |
| Table$.column.contains(value) | cb.like(root.get(column), "%" + value + "%") |
| Table$.column.notContains(value) | cb.notLike(root.get(column), "%" + value + "%") |
| Table$.column.containsIgnoreCase(value) | cb.like(cb.lower(root.get(column)), "%" + value.toLowerCase( ) + "%") |
| Table$.column.notContainsIgnoreCase(value) | cb.notLike(cb.lower(root.get(column)), "%" + value.toLowerCase( ) + "%") |

TABLE 4-continued

| JPAStreamer Predicate | JPA Predicate |
|---|---|
| Table$.column.isEmpty( ) | cb.equal(root.get(column), " ") |
| Table$.column.isNotEmpty( ) | cb.notEqual(root.get(column), " ") |

Sorted

Java Streams allow to sort its contents based on a specific condition or a set of conditions. These conditions are expressed through Java Comparator objects. An of example of a sorted Stream looks like this:

Stream.of(1, 2, 3, 4, 5).sorted(Comparator.naturalOrder( ))

In SQL, these conditions are expressed through ORDER BY clauses. An example ORDER BY clause looks like this: ORDER BY Column ASC Regular Java Comparators may lack information to construct correct ORDER BY clauses. As a solution, JPAStreamer generates its own set of specialized Comparators containing the necessary information needed to construct an ORDER BY clause.

JPA does not use Comparators to define sorting, but rather an Order class that is constructed via the CriteriaBuilder. Due to these differences, it is required to provide a valid conversion between the 2 APIs:

| JPAStreamer FieldComparator ↑↓ | JPA Order |
|---|---|
| ↑ | cb.asc(root.get(column)) |
| ↓ | cb.desc(root.get(column)) |

Distinct

Java Streams allow removing duplicate elements from its contents, i.e. create a Stream with distinct elements: An example of a distinct Stream looks like this:

Stream.of(1, 1, 2, 2, 5).distinct( )

In SQL, creating a distinct query is done by using the DISTINCT keyword. Since DISTINCT is not dependent on a specific column or value, JPAStreamer does not have to generate any additional dependencies as a compensation between the APIs, but a conversion between JPAStreamer and JPA must be provided:

| JPAStreamer Stream | JPA CriteriaQuery |
|---|---|
| stream.distinct( ) | criteriaQuery.distinct(true) |

Skip

Java Streams may allow applying an offset to its contents, i.e. skip n elements from the beginning of the Stream. An example of an applied offset looks like this:

Stream.of(1, 2, 3, 4, 5).skip(2)

In SQL, an offset is applied by using the OFFSET clause. An example OFFSET clause looks like this:
Offset 2

Since OFFSET is not dependent on a specific column, JPAStreamer does not have to generate any additional dependencies as a compensation between the APIs, but a conversion between JPAStreamer and JPA must be provided:

| JPAStreamer Stream | JPA Query |
|---|---|
| stream.skip(offsetValue) | query.setFirstResult(offsetValue) |

Limit

Java Streams may allow limiting the size of its contents. An example of an applied limit looks like this:

Stream.of(1, 2, 3, 4, 5).limit(2)

In SQL, a limit is applied by using the LIMIT clause. An example LIMIT clause looks like this:
Limit 2

Since LIMIT is not dependent on a specific column, JPAStreamer does not have to generate any additional dependencies as a compensation between the APIs, but a conversion between JPAStreamer and JPA must be provided:

| JPAStreamer Stream | JPA Query |
|---|---|
| stream.limit(limitValue) | query.setMaxResults(limitValue) |

Sub-Queries

Some stream pipelines, such as pipelines containing the intermediate operation flatMap, may be broken up into several subqueries and/or joins, thereby providing more operations to be executed on the database side. In variants of the present invention, pipelines with projections and/or aggregated values in the stream pipeline are broken up to sub-queries by or via JPA.

Specialized Sources

In variants of the present invention, the source may be replaced by special JPA operations so that the entire pipeline may be executed on the database side:

For example, the pipeline:

```
table.stream( ).
    .filter(Table$.column.greaterThan(20)
    .mapToInt(Table$.column)
    .summaryStatistics( );
```

May be rendered to a JPA source where the count, sum, average, min and max are computed on the database side and the corresponding values are directly forwarded to an IntSummaryStatistics instance.

Projection

In variants of the present invention, a subset of columns from a table may be selected using one of the intermediate operators mapToInt, mapToLong or mapToDouble. When a stream pipeline, containing said intermediate operators, is rendered and the provided parameter can be identified as (directly or indirectly) relating to one or more columns, corresponding JPA instructions (such as CompoundSelection and CriteriaQuery::select) may be invoked to reduce the amount of data being pulled in from the database.

Implementation

According to variants of the present invention, one or more computers (each comprising central processing units and computer memory) can execute the above disclosed methods whereby instructions are fetched, interpreted and executed by the central processing unit subsequently causing one or several computer memory locations to be read and/or updated. According to variants of the present invention there are a plurality of computers of which at least one distinct computer is executing database code (and not code according to the disclosed methods above) and the others are executing code according to the disclosed methods above (and not database code).

In variants of the present invention, a plurality of computers may be interconnected in a computer network, the network comprising a plurality of communication lines, communication ports, processing units and computer memory.

Figure 2:
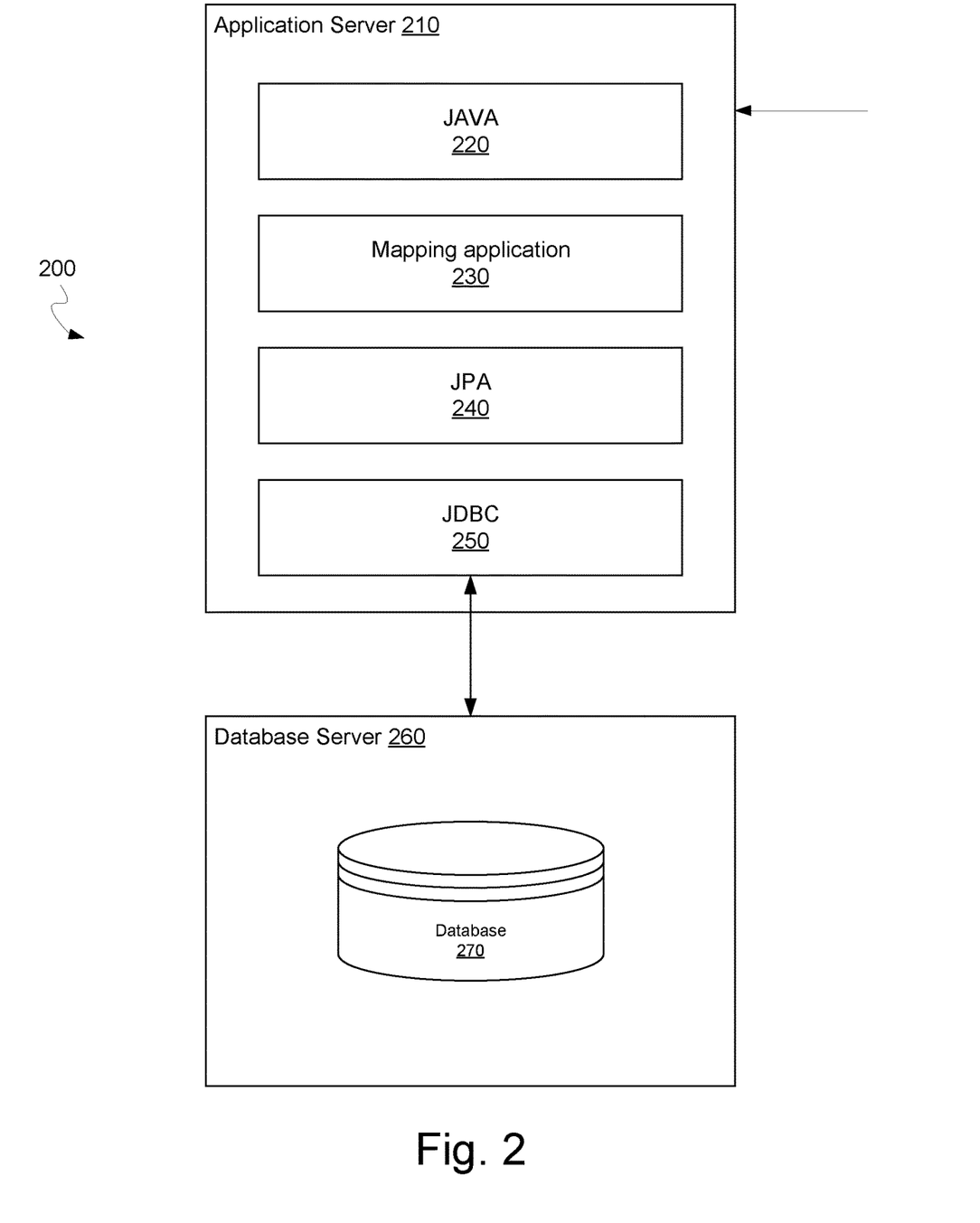
FIG. 2 illustrates schematically a system implementing the teachings of the present invention.

FIG. 2 is an exemplary system 200 in which the teachings of the present invention may be incorporated. The system, in its simplest implementation, may comprise an Application Server 210 and a Database Server 260.

The Application Server 210 may comprise Java Application 220, the Mapping Application 220, according to the present invention, JPA 230 and Java Database Connectivity (JDBC) 240. The Application Server 210 is described in more detail blow.

The Database Server 260 comprises a database 270, which may consist of one or several of above-mentioned databases and database interface applications.

Figure 3:
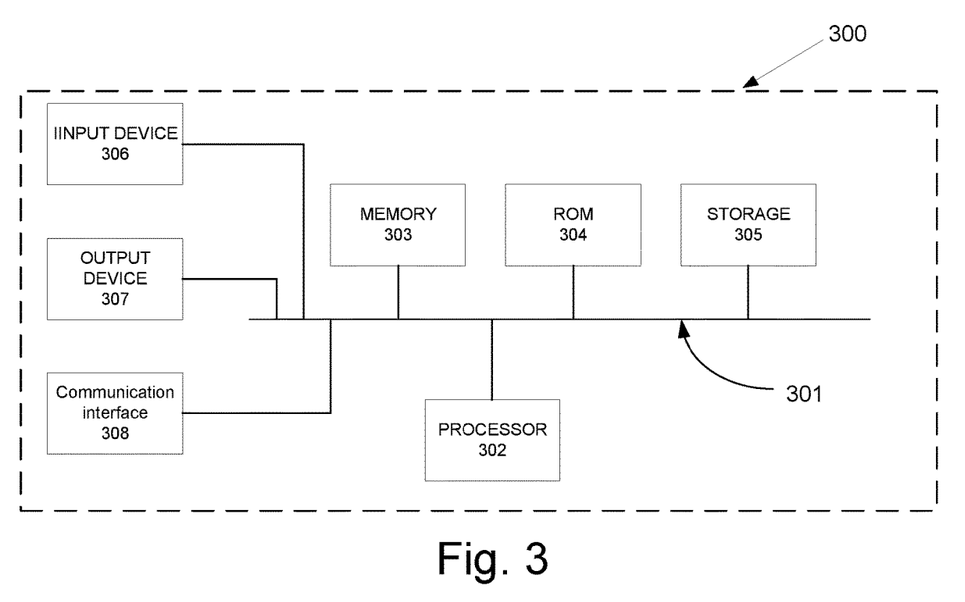
FIG. 3 illustrates schematically an exemplary application server according to FIG. 2.

FIG. 3 is a diagram of an exemplary application server computer 300, used in systems described herein. The computer 300 may include a bus 301, one or more processors 302, a memory 303, a read only memory (ROM) 304, a storage device 305, an input device 306, an output device 307, and a communication interface 308. Bus 301 permits communication among the components of the computer 300. The computer 300 may also include one or more power supplies (not shown). One skilled in the art would recognize that computer 300 may be configured in a number of other ways and may include other or different elements.

The processor 302 may include any type of processor or microprocessor that interprets and executes instructions. The processor is configured by programming instructions on non-transient computer readable media, such as the memory 303 which may include a random-access memory (RAM) or another dynamic storage device that stores information and instructions for execution by processor 302. Memory 303 may also be used to store temporary variables or other intermediate information during execution of instructions by processor 302.

ROM 304 may include a conventional ROM device and/or another static storage device that stores static information and instructions for processor 302. Storage device 305 may include any magnetic, optical or solid-state disk and its corresponding drive for storing information and instructions. The storage device 305 may also include a flash memory (e.g., an electrically erasable programmable read only memory (EEPROM)) device for storing information and instructions.

The input device 306 may include one or more conventional mechanisms that permit a user to input information to the computer 300, such as a keyboard, a keypad, a directional pad, a mouse, a pen, voice recognition, a touchscreen and/or biometric mechanisms, etc. Output device 307 may include one or more conventional mechanisms that output information to the user, including a display, a printer, one or more speakers, etc. Communication interface 308 may include any transceiver-like mechanism that enables computer 300 to communicate with other devices and/or systems. For example, communication interface 308 may include a modem or an Ethernet interface to a LAN. Alternatively, or additionally, communication interface 308 may include other mechanisms for communicating via a network, such as a wireless network.

The computer 300, consistent with the invention, provides a platform through which relevant data is sent and received from the connected devices, e.g., through a network. The relevant data including data, instructions and information. The computer 300 may also display information associated with the connected devices to a user of computer 300 in a graphical format. According to an exemplary implementation, computer 300 may perform various processes in response to processor 302 executing sequences of instructions contained in memory 303. Such instructions may be read into memory 303 from another computer-readable medium, such as storage device 305, or from a separate device via communication interface 308. It should be understood that a computer-readable medium may include one or more memory devices or carrier waves. Execution of the sequences of instructions contained in memory 303 causes processor 302 to perform the acts that have been described earlier. In alternative embodiments, hard-wired circuitry may be used in place of or in combination with software instructions to implement aspects consistent with the invention. Thus, the invention is not limited to any specific combination of hardware circuitry and software.

Consequently, one or more processing devices are configured to execute instructions to carry out the teachings of the invention and additional applications as described earlier.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Solid State Drive (SSD), etc.

Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A computer implemented method for efficient access to a database via a functional model-based procedure by seamlessly integrating Java Streams with database operations and directly mapping Java Streams to Java Persistence API, JPA, the JPA not being SQL, the method comprising:
generating by a processor: an initial builder corresponding to an original originating source, zero or more intermediate operations and a terminating operation;
storing in the memory, a sequence of operations;
translating the builder or parts of the builder to at least one operation using a JPA access language upon specifying the terminating operation;
the method further comprising optimization steps of:
reordering intermediate operations of same type while preserving Java Stream equivalence; or
squashing adjacent operations of the same type that preserve sequential operations: Order, Type, State, Side Effect, into one single equivalent operation; or
reordering intermediate operations that are of different types while still preserving a Java Stream equivalence; and
wherein if multiple intermediate operations of the same type are sequentially invoked, they are transformable into a singular operation.

2. The method of claim 1, comprising optimizing the initial builder before being rendered to JPA, wherein the optimization comprises reordering intermediate operations of different types while still preserving Java Stream equivalence.

3. The method of claim 2, wherein the intermediate operation and terminal operation are re-ordered, removed, added and/or replaced.

4. The method of claim 2, wherein a terminal operation is replaced by another terminal operation, a terminal operation is updated or wherein a terminal operator is replaced or updated in conjunction with modifying the list of intermediate operations to form an equivalent builder.

5. The method according to claim 1, if an intermediate operation is not translatable, the method further comprising moving the un-translatable operation further down the order in the builder and translating the translatable operation using the intermediate database abstraction layer language and subsequently applying the un-translatable operation on a resulting database object obtained from the translatable operation.

6. The method according to claim 1, further comprising subsequently rendering an intermediate operation is a "flatMap" operation to the JPA that reduces using one or more sub-queries.

7. The method according to claim 1, further comprising translating summarizing terminating operations to the JPA reducing the amount of data being transferred from the database.

8. The method of claim 7, wherein the terminating operation is one or several of sum, min, max, average and summaryStatistics.

9. The method according to claim 1, wherein the builder takes the shape of a java.util.Stream object.

10. A system comprising at least one processing unit and at least one memory, the system configured to execute a method according to claim 1.

* * * * *